United States Patent [19]

Lucas et al.

[11] 4,141,741

[45] Feb. 27, 1979

[54] COMPOSITIONS OF FLUORIDE GLASSES AND PROCESS FOR MANUFACTURING FLUORIDE GLASSES

[75] Inventors: Jacques Lucas, Betton; Michel Poulain, Pipriac; Marcel Poulain, Rennes, all of France

[73] Assignee: Etablissement Public dit "Agence Nationale de Valorisation de la Recherche (ANVAR)", Neuilly sur Seine, France

[21] Appl. No.: 805,420

[22] Filed: Jun. 10, 1977

[30] Foreign Application Priority Data

Jun. 15, 1976 [FR] France ............................ 76 18878
Mar. 24, 1977 [FR] France ............................ 77 09618

[51] Int. Cl.$^2$ ................................................ C03C 3/18
[52] U.S. Cl. ................................................ 106/47 Q
[58] Field of Search ........................ 106/47 Q, 47 R; 423/464

[56] References Cited

U.S. PATENT DOCUMENTS

| | | | |
|---|---|---|---|
| 3,468,682 | 9/1969 | Janikarama-Rao | 106/47 R |
| 3,615,764 | 10/1971 | Krolla | 106/47 Q |
| 3,816,600 | 6/1974 | Huizing et al. | 423/464 |

FOREIGN PATENT DOCUMENTS

552959 2/1958 Canada ............................ 106/47 Q
606509 8/1948 United Kingdom.

OTHER PUBLICATIONS

Poulain, M. et al. — "Verres Flores Au Tetrafluorure de Zirconium Proprietes Optiques d'un Verre Dope au Nd$^{+3}$" — Mat. Res. Bull., vol. 10, No. 4, Apr. 1975, pp. 243-246.
Poulain, M. et al., — "Nouveaux Verres Fluores" — Mat. Res. Bull., vol. 12, No. 2, Feb. 1977, pp. 151-156.
Barton, C. J., et al., "Phase Equilibria in the Systems NaF-ZrF$_4$, UF$_4$-ZrF$_4$, and NaF-ZrF$_2$-UF$_4$"- J. Phys. Chem. 62(6), 1958, pp. 665-676.
Schroder, J. "Hydrogen Fluoride Glasses"- Angew. Chem. Internat. Ed. 3 (1964), No. 5, p. 376.

*Primary Examiner*—Helen McCarthy
*Attorney, Agent, or Firm*—Charles A. Laff; J. Warren Whitesel; Howard B. Rockman

[57] ABSTRACT

Compositions of fluorinated glasses are disclosed which result from the ternary composition of ZrF$_4$ or HfF$_4$, BaF$_2$ and ThF$_4$ or UF$_4$, each component being within a specified range of composition indices, the indices for the separate components totalling unity.

1 Claim, 1 Drawing Figure

COMPOSITIONS OF FLUORIDE GLASSES AND PROCESS FOR MANUFACTURING FLUORIDE GLASSES

The present invention relates to new compositions of fluorinated glasses which make it possible to meet the needs in optical fields and in chemical and physical fields for which existing glasses are either less effective or unusable. The invention also relates to methods of manufacturing fluorinated glasses.

With regard to the state of the art of fluorinated glasses, it is useful to refer to an article entitled "Glasses fluorinated with zirconium tetrafluoride — Optical properties of a glass doped with $Nd^{3+}$" by the inventors of the present invention, which was published in the American review "Mat. Res. Bull." Vol. 10, pages 243 to 246, 1975, Pergamon Press. Inc. In this article the authors showed the existence of a glass domain in the $ZrF_4$—$BaF_2$—$NaF$ system.

An object of the present invention is to provide compositions of fluorinated glasses which make it possible to improve the qualities of known glasses and, in particular, lead to a product having possibilities which are distinctly superior to those of glasses of the $ZrF_4$—$BaF_2$—$NaF$ system.

According to one aspect of the invention, there is provided a fluorinated glass which is obtained from the ternary combination of three constituents A, B and C, each of which constituents is a fluoride, the vitreous composition being defined by the composition indices x for A, y for B and z for C, in moles per unit mass, with $x + y + z = 1$, in which A is $ZrF_4$ or $HfF_4$, B is $BaF_2$, and C is $ThF_4$ or $UF_4$, or a mixture of these two substances, x being within the range 0.52–0.63, y being within the range 0.27–0.38 and z being within the range 0.02–0.15.

According to another aspect of the invention there is provided a fluorinated glass which is similar to that defined above, but in which $ThF_4$ or $UF_4$ is replaced by one of the rare-earth fluorides or a mixture or a solid solution of these fluorides in constituent C, x being within the range 0.56–0.64, y being within the range 0.30–0.36 and z being within the range 0.02–0.12.

According to yet another aspect of the invention there is provided a fluorinated glass which contains, in addition to the above-mentioned constituents A, B and C, adjuvants with respective composition indices t, u and v, such that $x + y + z + t + u + v = 1$, D being a monovalent fluoride or mixture of fluorides, E being a divalent fluoride or mixture of fluorides, F being a trivalent, tetravalent or pentavalent fluoride or mixture of fluorides, t being within the range 0–0.05 if D = Li, within the range 0–0.10 if D = K, Rb, Cs or Tl, or within the range 0–0.25 if D = Na, u being within the range 0–0.08 if R = Mg or is a transition metal, or within the range 0–0.15 if E = an alkaline-earth or Pb, Sn or Cd, and v being within the range 0–0.08, x, y and z being appropriately modified as a function of t, u and v.

The introduction of alkaline or alkaline-earth fluorides as constituent B in the above-mentioned compositions naturally tends to lower their melting point and therefore, correlatively, the vitreous transition temperature and also the maximum limit utilisation temperature.

A feature of the present invention is the provision of a composition of fluorinated glass, the melting point of which is appreciably higher than that of the fluorinated glasses mentioned above and forming a part of the art, while at the same time retaining certain qualities of the previously proposed glasses.

According to a still further aspect of the present invention there is provided a fluorinated glass which results from the ternary composition of three constituents A', B' and C', each of which is a fluoride, the vitreous composition being defined by the composition indices x for A', y for B' and z for C', in moles per unit mass, with $x' + y' + z' = 1$, in which A' is $ZrF_4$ or $HfF_4$, B' is $ThF_4$ or $UF_4$, or a mixture of these two substances, and C' is a rare-earth fluoride, x' being within the range 0.40–0.80, y' being within the range 0.15–0.50 and Z' being within the range 0.02–0.20.

According to yet a further aspect of the invention, there is provided a fluorinated glass which contains, in addition to the above-mentioned constituents A', B' and C' adjuvants D', E', F', G', I', K' and L' with, respectively, composition indices t', u', v', w', i', j', k' and l', such that $x' + y' + z' + t' + u' + v' + w' + i' + j' + k' + l' = 1$, D' being a monovalent fluoride or mixture of fluorides, E' being a divalent fluoride or mixture of fluorides, F' being a fluoride or mixture of fluorides of higher valency, G' being a monovalent of divalent oxide or mixture of oxides, I' being a sesquioxide or a mixture of several sesquioxides, J' being an oxide or mixture of oxides of higher valency, K' being a complex anion salt or a mixture of several complex anion salts, and L' being a halide or chalcogenide or a mixture of halides and/or chalcogenides, x' being within the range 0.35–0.70, y' being within the range 0–0.30, z' being within the range 0–0.20, t' being within the range 0–0.30, u' being within the range 0–0.35, v' being within the range 0–0.30, w' being within the range 0–0.10, i' being within the range 0–0.15, j' being within the range 0–0.25, k' being within the range 0–0.15 and l' being within the range 0–0.10.

In the last composition it should be understood that the term complex anion salts is used to designate, for instance, carbonates, sulphates, phosphates, tungstates, fluorophosphates, fluorogermanates, or any similar combination.

It is furthermore obvious to those versed in the art that the addition of any oxyfluoride is equivalent to the addition of the mixture of the corresponding oxides and fluorides in appropriate proportions.

In order to obtain a fluorinated glass with the first mentioned composition it is possible to choose the following initial products. The barium fluoride (constituent B) is a commercial product which is directly usable. The zirconium fluoride (constituent A) is a commercial product which is purified by double sublimation in vacuo. The thorium fluoride (constituent C) is a commercial product which is purified by treatment in vacuo at towards 350° C. The uranium fluoride is also a product which can be obtained commercially.

In preparing the vitreous mass from these components, it is necessary to eliminate all traces of humidity which would be liable to bring about the appearance of precipitations in the vitreous mass. Furthermore, the mixture must be brought to a temperature at which the zirconium fluoride is volatile and corrosive, and this necessitates the taking of appropriate precautions. The handling of the fluorides in order to make the mixture is carried out in a glove box. The melting of the mixture is effected, for instance, is a crucible made of a precious metal such a platinum, hermetically sealed, in a dry argon atmosphere. The temperature is gradually raised to 850° C. It is necessary to go appreciably above the melting temperature in order completely to dissolve the various constituents and reduce the viscosity of the bath, which is an essential condition for achieving good homogenization. After mechanical shaking, the crucible is opened. The molten glass is poured, in a dry nitrogen atmosphere, on to a metal mould, which may be preheated. The method of preparation which has just been described is also suitable for glasses of the other compositions described, naturally with a change in the initial products.

However, this method of preparation has a number of disadvantages. It requires the use, as initial products, of anhydrous fluorides which are generally expensive, a fact which would considerably limit the potential applications of the glasses obtained by this method owing to the prohibitive price of the end product. The storage and handling of fluorides usually have to be carried out with protection from the ambient air, since in the long run the humidity in the atmosphere causes deterioration of the halides, and the partial hydrolysis which results leads to the formation of corrosive hydrofluoric acid vapours, while the solid phase becomes charged with oxyfluorides. The synthesis of the glass requires the use of a special technology in order to carry out the melting in an inert environment. To prepare small quantities of glass it is of course possible to use sealed metal tubes. But for large quantities it is necessary to provide a hermetic enclosure capable of withstanding a vacuum, of being filled with an inert gas and of withstanding a temperature of the order of 800° C.; which requires a substantial amount of preparatory work.

A further feature of the invention is the provision of a method for the preparation of fluorinated glasses corresponding to the compositions defined above and thus appreciably to reduce the cost of the end products.

According to yet a further aspect of the invention, there is provided a method of preparing the fluorinated glasses whose compositions have been given above and also, more generally, those fluorinated glasses, whose composition consists mainly of fluoride material, in which:

(1) metal oxides and fluorides are mixed in proportions depending on the desired final composition,
(2) there is added to the homogeneous mixture obtained a quantity of acid ammonium fluorides $NH_4F$, the nHF being determined so that the mass of acid ammonium fluoride is equal to about twice the mass of tetravalent oxide, such as, in particular, $ZrO_2$, plus about one and a half times the mass of trivalent oxide plus about once times the mass of the other oxides.
(3) the whole composed of the mixture plus the acid ammonium fluorides is heated to a temperature between 300° and 400° C. for at least sone 30 minutes,
(4) the residual mass is gradually heated to a temperature of about 800° C. to evacuate the excess ammonium fluoride,
(5) the molten mass is refined and homogenised in the traditional manner of such a step by shaking at this temperature,
(6) the molten mass composing the glass is poured in the traditional manner.

It is obvious that, after pouring, the fluorinated glass will, if appropriate, be subjected to the traditional treatments of the glass-making industry.

It should be noted that the method according to the invention enables direct use to be made of industrial oxides, such as those currently employed in the traditional glass-making industry. The fact that these products most often contain a by no means negligible quantity of adsorbed water is unimportant. Furthermore, all the operations leading to the formation of the vitreous phases can be carried out in the ambient atmosphere without special precautions.

Use is, in fact, made of the fluorinating action of the ammonium fluoride $NH_4F$ or the acid ammonium fluorides $NH_4F$, nHF. This property of ammonium fluoride is well known, but it has hitherto been used only in the preparation of some crystallised fluorides. In the case of the preparation of these crystallised fluorides, however, the elimination of the last traces of the ammonium fluoride, which has to be added in excess, requires treatment in vacuo or in an inert atmosphere, which is avoided here.

The above-mentioned characteristics of the invention will become more clearly apparent from a reading of the following description of embodiments of the invention, given by way of example, with reference to the accompanying drawings, in which.

Figure 1:
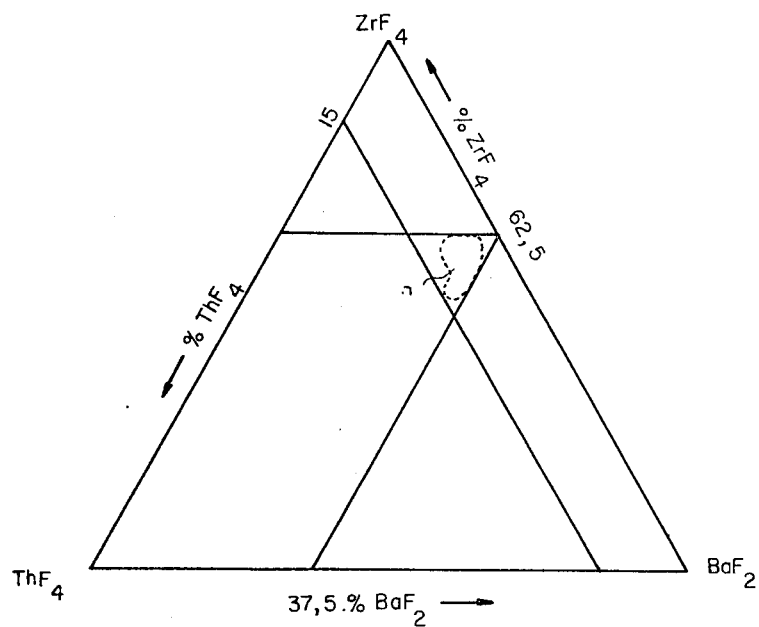
FIG. 1 is a ternary diagram of the glasses of composition A, B and C.

As is indicated on the ternary diagram $ZrF_4 - BaF_2 - ThF_4$, given by way of example in FIG. 1, a systematic study of this ternary composition has enabled a zone defined by a curve a to be identified as enclosing the vitreous domain, the curve having the traditional form of a kidney bean and having a more or less large area depending on whether the molten glass is poured, during preparation, on to a surface of higher or lower temperature. The vitreous domain can be enlarged if the quenching speed is increased.

By way of indication, a glass according to the invention is obtained from an initial mixture consisting of $ZrF_4$, $BaF_2$ and $ThF_4$ in the following percentages by weight: $ZrF_4 - 57.50\%$; $BaF_2 - 33.75\%$; $ThF_4 - 8.75\%$.

Among the divalent transition-metal fluorides which can be used as adjuvants, mention may be made of the fluorides as Cr, Mn, Fe, Co, Ni, Cu, Zn etc. Among the trivalent, tetravalent or pentavalent fluorides, use may be made of the fluorides of Ti, V, Nb, Ta, Bi, Sb, Ge and Si.

By way of example, we shall also give the composition of a fluorinated glass according to the invention which is particularly stable and which contains sodium as adjuvant D. The glass composition is as follows: $ZrF_4$ (0.50) — $BaF_2$ (0.20) — $ThF_4$ (0.075) — NaF (0.225).

Figure 2:
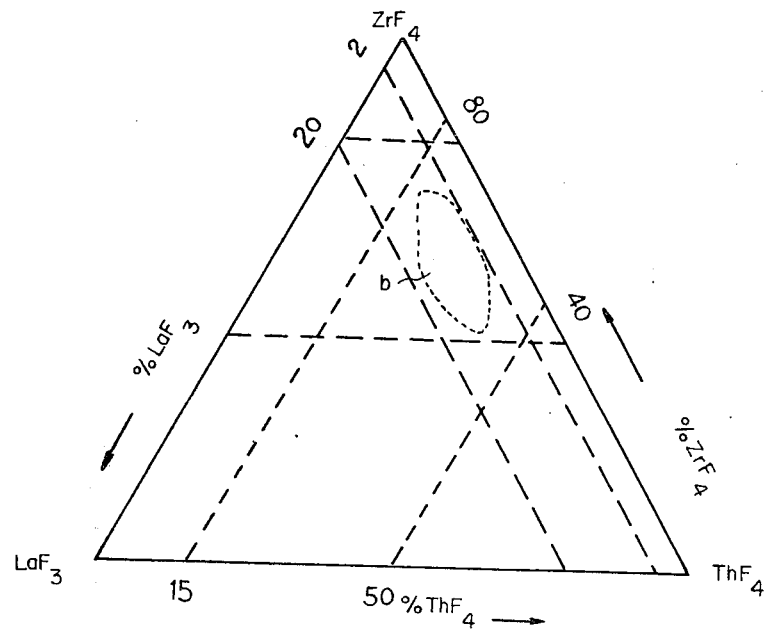
FIG. 2 is a ternary diagram of the glasses of composition A', B' and C'.

A systematic study of the ternary diagram $ZrF_4 - ThF_4$ — rare-earth fluoride, shown by way of example in FIG. 2, enables a zone defined by a curve b to be identified as enclosing the vitreous domain.

It should be noted that the raising of the melting point of the composition A' B' C' of the fluorinated glass according to the invention described with reference to FIG. 2, in comparison with the composition of the fluorinated glass A, B, C of FIG. 1, is due to the fact that the composition according to the invention only contains, to use glass-makers' terminology, forming-ion fluorides of this type of glass, whereas in the previous composition, alkaline or alkaline-earth fluorides include modifying ions, which, act as a flux. The forming ions in fact ensure the stability of the aperiodic three-dimensional lattice of the glass.

By way of example we now give below the composition of a glass according to the invention which has good viscosity and a slow recrystallisation speed: $A' = ZrF_4$, $B' = ThF_4$, $C' = LaF_3$, $D$ = mixture of LiF (0.069) and NaF (0.034), $E$ = mixture of $BaF_2$ (0.22), $PbF_2$ (0.018) and $CaF_2$ (0.004) and $F' = AlF_3$; $x' = 0.53$, $y' = 0.077$, $z' = 0.042$, $t' = 0.103$, $u' = 0.242$ and $v' = 0.006$.

In the process of preparation of such a glass, once the metal oxides and fluorides have been mixed and the acid ammonium fluoride has been added in the proportions stated above, the whole mixture is heated relatively slowly in a furnace which has a certain thermal inertia until a temperature of about 800° C. is reached in order to ensure complete evacuation of the excess ammonium fluoride. At the beginning of the heating process, during this preparation, it is preferable to arrange for the mixture to be heated with a plateau or a quasi-plateau of temperature between 300° C. and 400° C.

Mention may be made, by way of example, with regard to fluorinated glasses according to the invention, of the following properties. They are stable with respect to the ambient air, even if it is humid. They do not suffer any apparent damage if heated in air, even to 350° C. They withstand perfectly anhydrous, liquid or gaseous $F_2$, $ClF_3$ and HF. They have average hardness and a fairly high density of the order of 4.80 g/cm$^3$.

With regard to the transparency interval, the optical window ranges from 0.23 microns to 7 microns, the attenuation in the infra-red region only becoming appreciable from 8 microns onwards. This transparency property in the infra-red region makes it possible to envisage, for glasses according to the invention, many applications in which they could replace the more expensive products used at present, such as fluorine.

Moreover, the property of being resistant to fluoride makes it possible to envisage the use of glasses according to the invention for the carrying of products as active as uranium hexafluoride. It should be noted that the glasses obtained can be worked by traditional glass-making methods.

It may also be noted that glasses according to the invention include heavy-nucleus elements, making it possible to envisage their use in transparent nuclear laboratory windows for absorbing radiation.

What is claimed is:

1. A fluoride glass which is transparent in the infrared spectrum, said glass being obtained from the ternary combination of three constituents A, B and C, each of which constituents is a fluoride, the vitreous composition being defined by the composition indices x for A, y for B and z for C, in moles per unit mass, with $x + y + z = 1$, in which A is selected from the group consisting of $ZrF_4$ and $HfF_4$, B is $BaF_2$ and C is selected from the group consisting of $ThF_4$ and $UF_4$ and in which x is within the range of 0.52–0.63, y is within the range 0.27–0.38 and z is within the range 0.02–0.15.

* * * * *